United States Patent [19]

Maier

[11] Patent Number: 4,526,090
[45] Date of Patent: Jul. 2, 1985

[54] FLEXIBLE CONDUIT TAKE-UP APPARATUS

[75] Inventor: Robert L. Maier, Atherton, Calif.

[73] Assignee: McCormick Morgan, Inc., San Francisco, Calif.

[21] Appl. No.: 576,052

[22] Filed: Feb. 2, 1984

[51] Int. Cl.³ .............................................. F24F 7/007
[52] U.S. Cl. ....................................... 98/33.1; 14/71.5;
98/DIG. 7; 137/355.16; 137/615; 138/120;
248/49; 285/165; 285/298
[58] Field of Search ................... 14/71.5; 98/32, 33 R,
98/39, 40 C, DIG. 7, 1; 137/355.16, 615;
248/49, 68.1; 285/163, 164, 165, 298, 302;
138/118, 120, 155

[56] References Cited

U.S. PATENT DOCUMENTS

| | | | |
|---|---|---|---|
| 3,399,545 | 9/1968 | Anderson et al. | 285/302 X |
| 3,521,316 | 7/1970 | Adams et al. | 14/71.5 |
| 3,779,003 | 12/1973 | Boissevain et al. | 248/49 X |
| 3,792,189 | 2/1974 | Stengel et al. | 174/69 |
| 3,893,480 | 7/1975 | Dunbar | 137/615 |
| 4,266,744 | 5/1981 | Bergman | 248/49 |
| 4,357,860 | 11/1982 | Krzak | 98/33 R |
| 4,487,218 | 12/1984 | Sifri | 138/120 X |

FOREIGN PATENT DOCUMENTS 1918190  10/1970  Fed. Rep. of Germany ...... 285/164

Primary Examiner—Harold Joyce
Attorney, Agent, or Firm—Townsend and Townsend

[57] ABSTRACT

A tray is mounted along a telescoping structure, typically suspended beneath a segment of the telescoping structure. The tray provides a space for a flexible conduit to be gathered into and payed out from as the structure changes in length. A conduit connector couples segments of the conduit and defines a fluid path which makes two substantially right angle turns to increase the minimum radius which the flexible conduit must assume during the expansion and contraction of the structure. The flexible conduit can be attached to rigid conduits extending between the tray and either end of the structure. A Z-shaped conduit connector can be pivotally mounted to the tray, or can be articulated, to increase the usable length of flexible hose stored within the tray.

27 Claims, 16 Drawing Figures

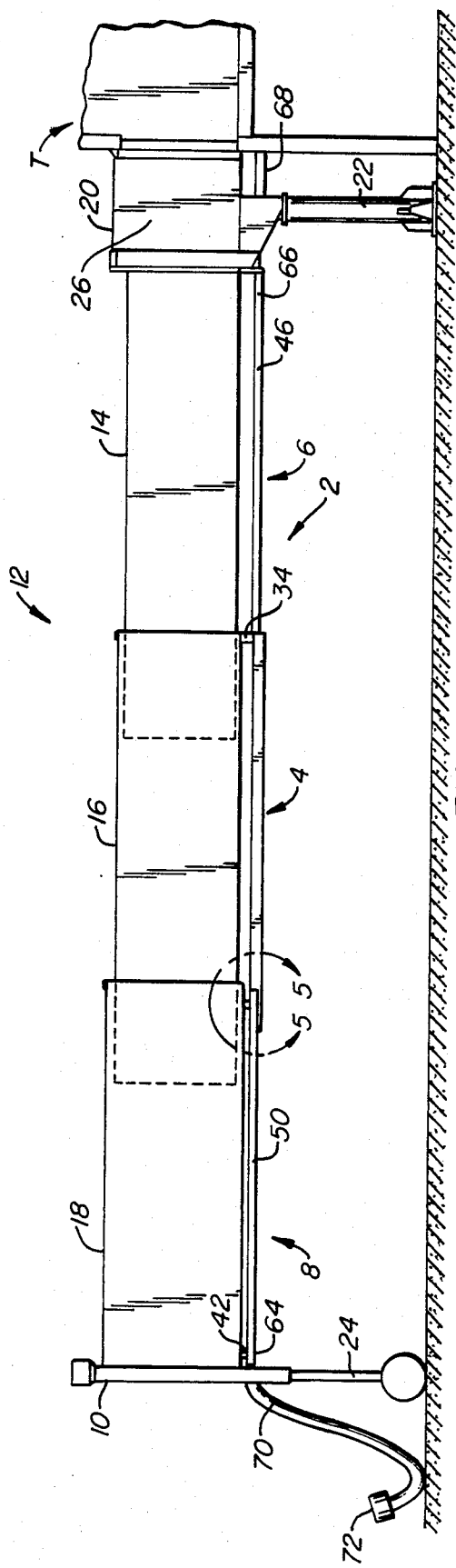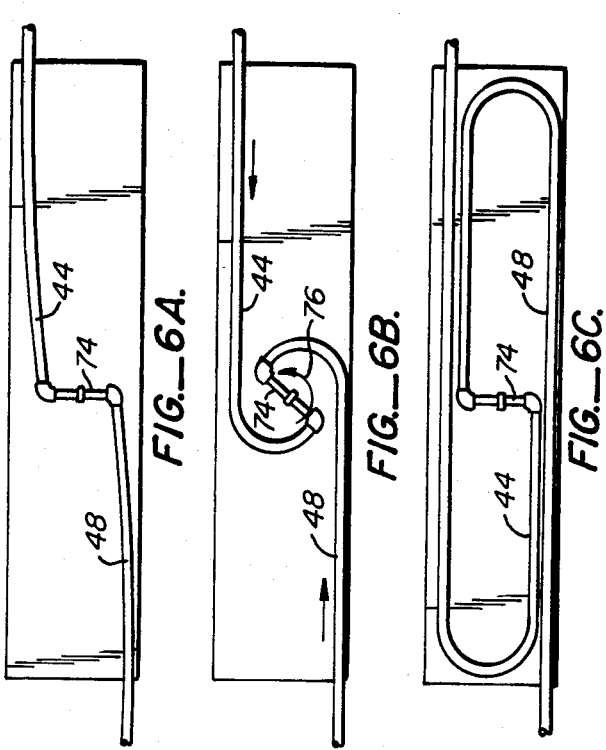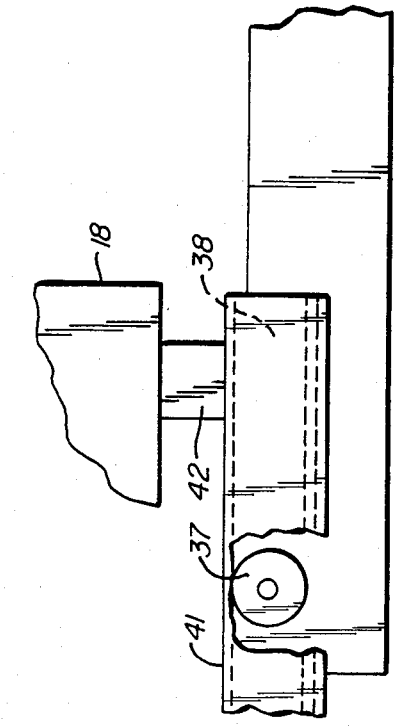

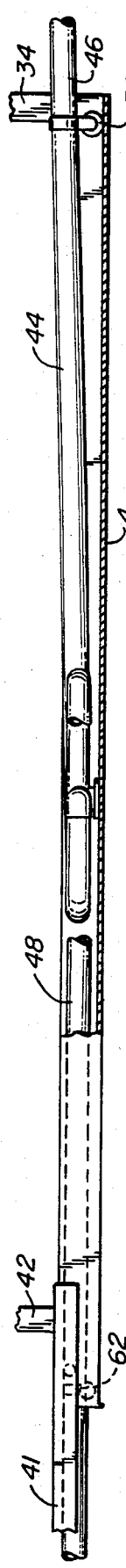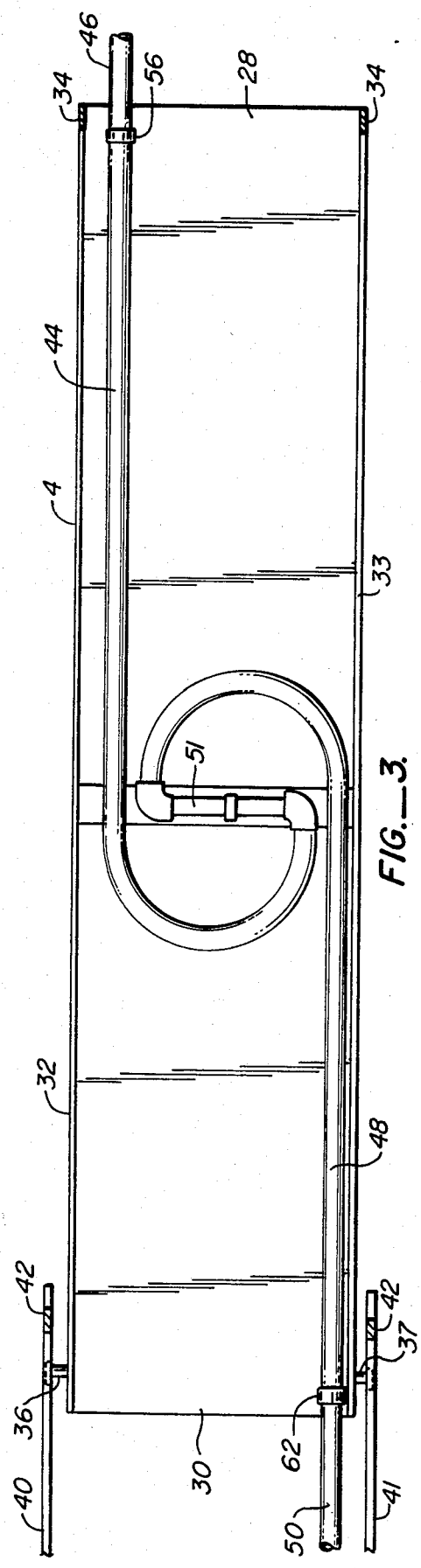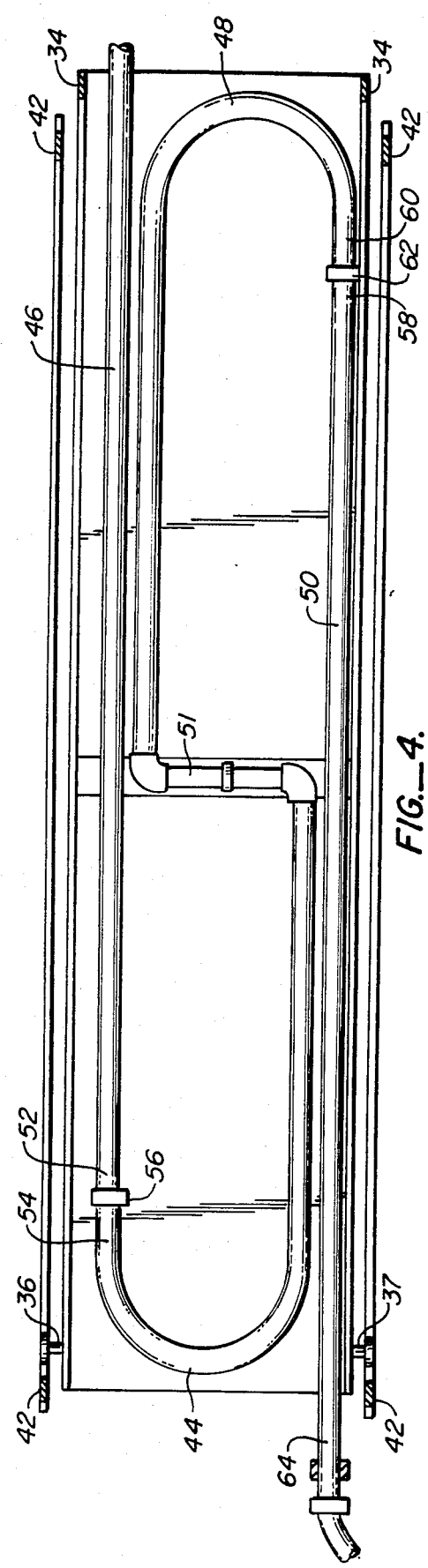

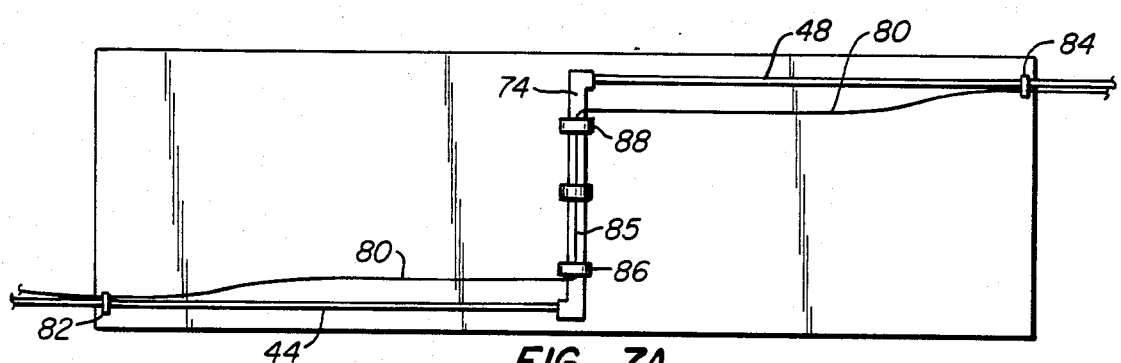
FIG.—7A.
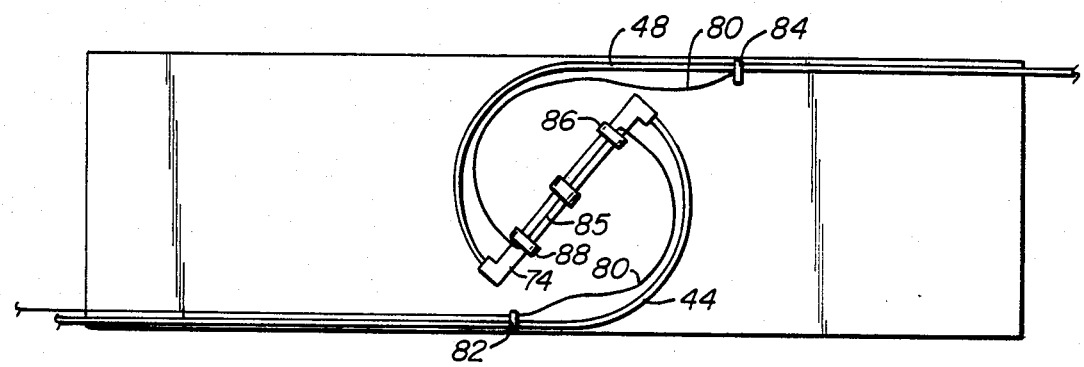
FIG.—7B.
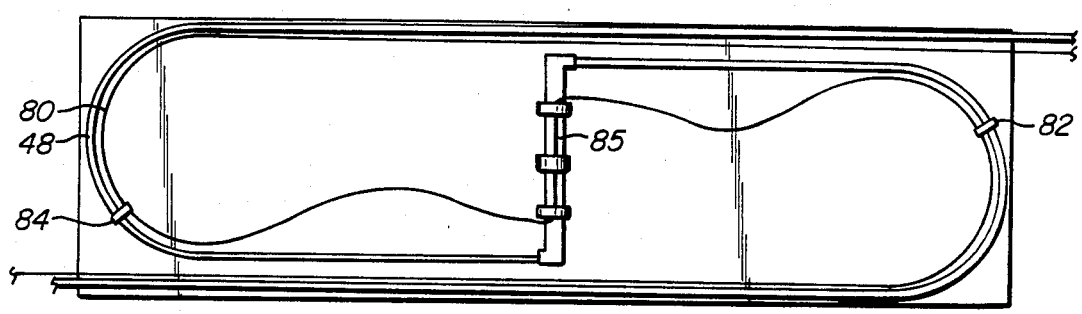
FIG.—7C.
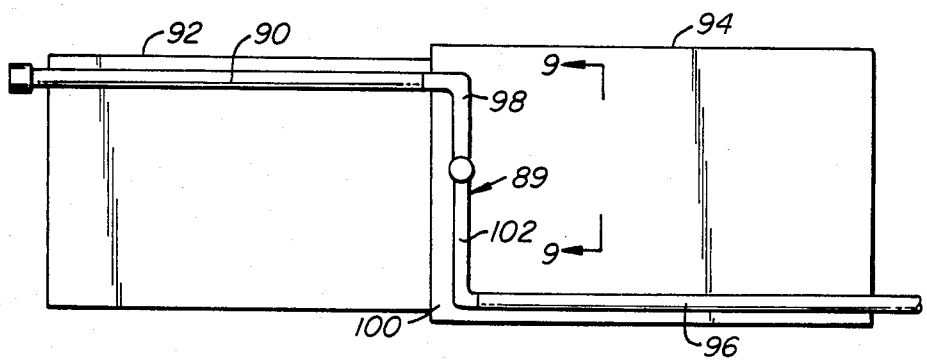
FIG.—8A.

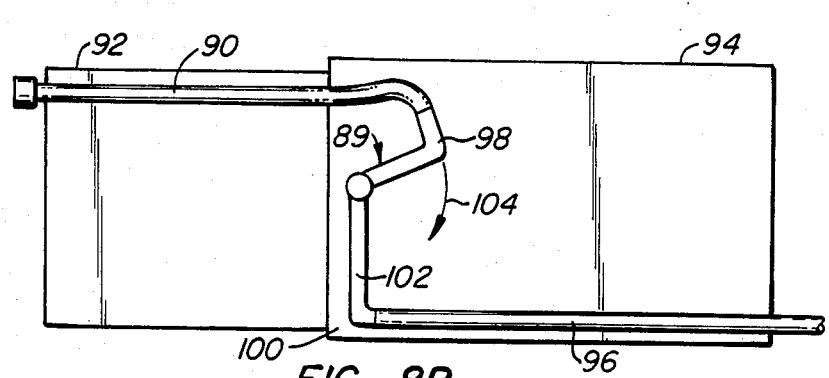
FIG._8B.
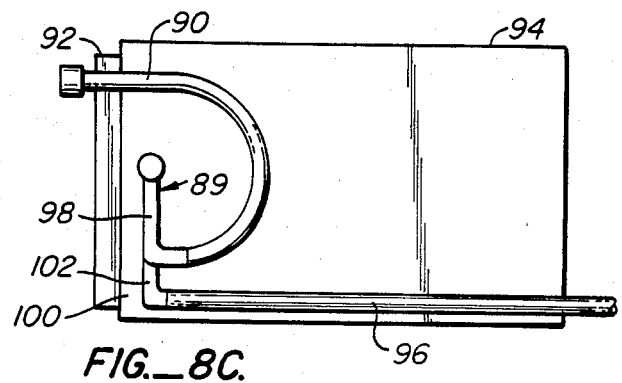
FIG._8C.
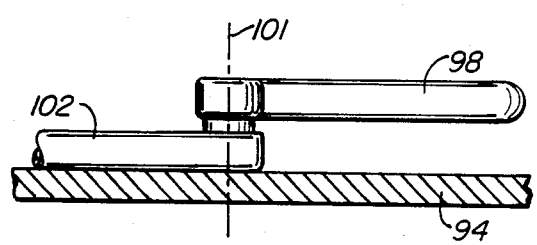
FIG._9.
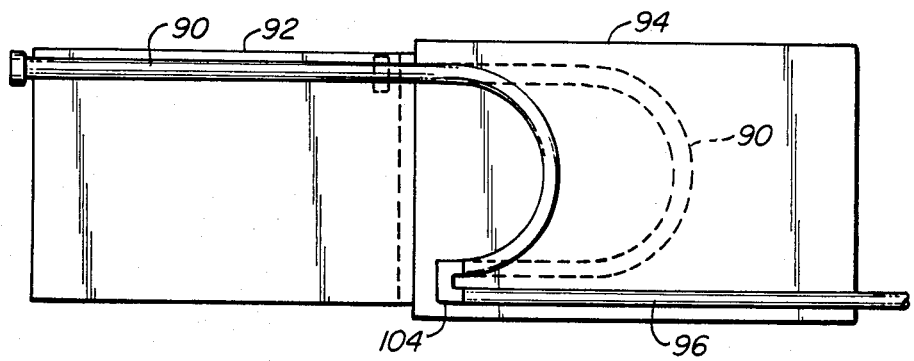
FIG._10.

FLEXIBLE CONDUIT TAKE-UP APPARATUS

BACKGROUND OF THE INVENTION

At most relatively large airports it has become common for passengers to be boarded onto and off-boarded from the waiting aircraft via a telescoping bridge. One end of the telescoping bridge is situated at the doorway of the waiting area in the terminal. When the aircraft is in position near the terminal area, the outer end of the telescoping bridge, typically supported by a wheeled support structure, is moved into position adjacent the door of the waiting aircraft.

Aircraft are equipped with an auxiliary power unit, or APU, to provide power for the aircraft while it is on the ground and the engines are not operating. The APU powers the on-board air conditioning unit and supplies power for starting its engines. However, the APU is a relatively inefficient power source so that an alternative, off-board, source for powering the on-board air conditioning unit, and also for starting up the jet engines, is desirable. Further, operating the APU adds to the relatively high level of air and noise pollution at the airport.

The use of telescoping bridge structures for passage of passengers between the aircraft and the terminal provides a vehicle by which servicing lines, such as electric cables, can be carried to the waiting aircraft. In U.S. Pat. No. 3,399,545 an expandable duct is disclosed for carrying preconditioned air to waiting aircraft. The preconditioned air is then fed directly to the aircraft so that the APU is not needed to either heat or cool the aircraft interior. The duct is preferably of a commercially available type in which a spiral wire is covered with a flexible plastic covering. The use of this longitudinally flexible material allows the duct to expand and contract in accordance with the length of the bridge. However, the air pressures which can be used with such a device are necessarily quite low, in the range of inches of water rather than pounds per square inch. Thus, such a system would be ineffective for supplying the aircraft with a supply of air power at pressures and in amounts sufficient to start the engines so that the APU must still be used during engine start-up.

One method for supplying air at pressures and in amounts sufficient to start the engines is to pull medium pressure, flexible hose from the terminal to the aircraft. However, these hoses are heavy, awkward to manipulate, and obstruct the area around the aircraft. Another method is to construct underground pressurized air conduits to the aircraft waiting area. Flexible hoses from normally covered access holes are connected to the aircraft so the APU need not be used. However, these underground systems are expensive to install and once in place restrict the areas at which aircraft can be parked. A third method is disclosed in U.S. patent application No. 4,357,860, assigned to the assignee of this application, titled Telescoping Conduit for Pressurized Air. In that application a telescoping conduit is shown supported by the telescoping bridge structure to supply the aircraft with the needed air.

SUMMARY OF THE INVENTION

At least one tray is mounted to a telescoping bridge structure to support and store one or more conduits, at least part of each of the conduits being flexible. A conduit connector is provided which defines a fluid path between adjacent segments of the fluid conduit. The path so defined makes two substantially 90° turns to maximize the radius of curvature of the flexible hose stored within the tray.

In several preferred embodiments the connector is generally Z-shaped. The opposite-facing ends of the Z-shaped connector are spaced a significant distance apart to increase the minimum bend radius which the flexible hose must assume during the expansion and contraction of the telescoping structure with the attendant paying out and gathering in of the flexible hose within the tray. The Z-shaped connectors can be rigid members mounted to the center of a tray. The rigid Z-shaped connector may be pivotally mounted to the tray to increase the usable length of flexible hose which can be stored within the tray. The Z-shaped connector can also be articulated at its center, rather than rigid, so to assume a generally Z-shape when extended and an L-shape when folded back upon itself. Such an articulated connector is preferably mounted at one end of the tray. The connector can also have a generally U-shape with closely spaced apart ends. The U-shaped connector is mounted at one end of the tray with its ends facing the center of the tray.

When used with a multiple-segment telescoping structure, one tray provides space for the flexible hose to be gathered into and played out from the tray as the structure changes in length. A length of hose approximately three times the length of the tray can be stored within the tray. Thus, a tray about one third the length of the telescoping structure when fully extended will accommodate all the hose needed for the three segment structure.

A primary advantage accruing from the present invention is that the minimum radius which the flexible hose, stored within the tray mounted adjacent the telescoping structure, is required to assume during extension and contraction of the structure is maximized by the use of the fluid connection member. This is important because a hose used to transport air at moderate pressures, for example at 20–45 psig (pounds per square inch gauge), and at relatively high rates of flow, such as 1500 to 5000 cfm (cubic feet per minute), is quite stiff and incapable of being bent into relatively small radii without damage to the hose. For example, hose having a 6-inch diameter and having sufficient strength to withstand the operating pressures may have a minimum theoretical bending radius of 14 inches. However, as a practical matter, due to the repeated flexion of the hose and the force required to bend the hose, the minimum radius which is practical is much greater, perhaps as much as 24 inches. Therefore by increasing the smallest radius the hose is subjected to, stronger hose can be used for the same size tray.

Other features and advantages of the present invention will become apparent from the following description in which the preferred embodiments have been set forth in detail in conjunction with the accompanying drawings.

BRIEF DESCRIPTION OF THE DRAWINGS

FIG. 1 is a side view of the telescoping structure in an extended configuration with a first embodiment of the present invention supported beneath the structure.

FIG. 2 is an enlarged partial side view of the apparatus shown in FIG. 1.

FIG. 3 is a top view of the tray shown in FIG. 2.

FIG. 4 shows the tray of FIG. 3 when the telescoping structure is fully retracted.

FIG. 5 is an enlarged view of a portion of FIG. 1 taken along line 5—5 detailing the support of one end of the tray by a guide rail.

FIGS. 6A-6C are schematic representations of the tray, a pivotable Z-shaped member and associated conduits when the telescoping structure is fully extended, partially retracted and fully retracted, respectively.

FIGS. 7A-7C are schematic representations similar to FIGS. 6A-6C showing the use of two conduits.

FIGS. 8A-8C show an embodiment of the invention using an articulated Z-shaped member mounted to one end of a tray in extended, partially retracted and fully retracted conditions.

FIG. 9 is an enlarged side view of the pivot coupling of FIG. 8A.

FIG. 10 shows an embodiment using a stationary, U-shaped connector.

DETAILED DESCRIPTION OF THE PREFERRED EMBODIMENTS

Turning now to FIGS. 1-3, a first embodiment of the flexible conduit take-up apparatus 2 of the present invention broadly includes a tray 4, a first conduit 6 extending between a terminal T and tray 4, and a second conduit 8 extending between tray 4 and the outer end 10 of a telescoping structure 12.

Telescoping structure 12 includes an inner segment 14, a center segment 16 and an outer segment 18. The first end 20 of telescoping structure 12 is supported by a pivot post 22 while outer end 10 is supported by a wheeled support structure 24. Telescoping structure 12 is conventional and is used to transport passengers between terminal T and an awaiting aircraft (not shown) adjacent outer end 10. To accommodate pivotal movement of the structure, a flexible segment 26 at first end 20 of structure 12 is provided and surrounds a doorway, not shown, in terminal T.

Turning now to FIGS. 2-5, tray 4 is an elongate flat tray having an open inner end 28, an open outer end 30 and relatively short upwardly extending side walls 32, 33 extending between inner and outer ends 28, 30. Tray 4 is supported at inner end 28 by members 34 connecting center segment 16 to side walls 32, 33. Outer end 30 of tray 4 is supported by the engagement of rollers 36, 37 within longitudinal grooves 38 of guide rails 40, 41. The ends of guide rails 40, 41 are supported beneath outer segment 18 by support members 42.

First conduit 6 comprises a first flexible hose 44 and a first rigid pipe 46. Second conduit 8 includes a second flexible hose 48 and a second rigid pipe 50. Flexible hoses 44, 48 are fluidly connected by a Z-shaped fluid connection member 51 mounted centrally within the tray. The outer end 52 of first pipe 46 connects with the inner end 54 of first hose 44 and is supported by tray 4 through a roller 56. Likewise, the inner end 58 of pipe 56 is connected to the outer end of hose 48 and is supported by tray 4 through a roller 62. Rollers 56 and 62 help to reduce the force required to manipulate conduits within the tray.

The outer end 64 of pipe 50 is supported beneath outer segment 18 and the inner end 66 of pipe 46 is supported at first end 20 of structure 12, both in conventional fashion. To accommodate the movement of structure 12 about pivot post 22, a flexible hose segment 68 connects a source of compressed air at terminal T with inner end 66. A flexible connecting hose 70, having a fitting 72 at its outer end, extends from outer end 64 for connection to an appropriate fitting on the waiting aircraft.

FIG. 3 illustrates the general configuration of the flexible hoses within the tray when the telescoping structure is fully extended. It can be seen that a provision of Z-shaped connection member 51 permits a much larger radius of curvature for the flexible hose, as much as double, than would otherwise be possible. In the fully retracted position shown at FIG. 4, the same large radius of curvature is maintained.

Turning now to FIGS. 6A-6C the operation of the apparatus of the invention is shown when used in conjunction with a pivotally mounted Z-shaped fluid connection member 74. FIG. 6A represents the attitude of the Z-shaped member when the telescoping structure is fully extended. FIG. 6B shows the modified apparatus when the structure is partially retracted. It should be noted that Z-shaped member 74 has rotated approximately 120° in the direction of arrow 76 (counterclockwise) from its position in FIG. 6A. FIG. 6C shows the apparatus in a fully retracted condition with Z-shaped member 74 located approximately 180° counterclockwise from its position of FIG. 6A. Member 74 is pivotally connected to tray 4 so that member 74 naturally adjusts its angular orientation in response to the forces applied. The use of Z-shaped member 74 allows more hose to be stored within tray 4 compared with member 51.

It should be noted that connection members 51, 74 have been described as Z-shaped. However, it is intended that such characterization is to cover other connectors in which the ends face generally opposite directions and are spaced apart so that the directions are not colinear but are significantly offset from one another.

In the above described embodiments, the Z-shaped members have been mounted centrally within the tray. Depending upon the length of the individual segments of the telescoping structure, it may be desirable to mount the Z-shaped member offset from the center of the tray. Also, the entire length of first and second conduits 6, 8 could be of a flexible hose. However, in that case it may be desirable to use three telescoping trays to support the entire length of the conduits. Further, apparatus 2 could be mounted on the top of the telescoping structure as well. Or, the roof of center segment 16 could be used as tray 4, although it may be needed to add side members corresponding to side walls 32, 33 of tray 4 to insure the flexible hose remains on top of the tray, in this case on top of center segment 4.

Two or more conduits, such as for pressurized air, water and electricity, can be accommodated with the present invention. FIGS. 7A, 7B and 7C disclose an embodiment similar to that shown in FIGS. 6A-6C with the addition of a flexible cable 80. Cable 80 is connected to first and second flexible hoses 44, 48 at points 82, 84. A central portion 85 of cable 80 is also connected to member 74 by clamps 86, 88 so portion 85 swivels with member 74. Since cable 80 is located to the inside of hoses 44, 48, its radius of curvature is shorter than that of hoses 44, 48. This results in a nominally shorter path for the storage of cable 80 so cable 80 tends to buckle along part of its length as shown in FIG. 7C. To accommodate the excess, the cables, hoses or other conduits are arranged in order of flexibility with the stiffest, in this case hoses 44, 48, to the outside.

A further aspect of the invention involves the use of an articulated Z-shaped connector 89 as shown in FIGS. 8A–8C. A flexible hose 90 is supported by a movable tray 92. A stationary (relative to tray 92) tray 94 supports a second hose 96 which may be rigid or flexible. Hose 90 is connected to an L-shaped member 98 of connector 89 pivotally mounted to one end 100 of tray 94 to pivot about an axis 101. As shown in FIG. 9, member 98 lies above and is fluidly connected to another L-shaped member 102. Member 102, fixed to end 100 of tray 94, fluidly connects hose 96 with member 98. The two L-shaped members 98, 102 are configured to assume a generally Z-shape when trays 92, 94 are fully extended. However, since hose 96 does not move there is no reason for both members 98, 102 to pivot. Retraction of tray 92, shown in FIG. 8B, causes member 98 to pivot in the direction of arrow 104 until it overlies member 102 when tray 92 is fully retracted, see FIG. 8C, so that connector 89 assumes a generally L-shape.

An alternative to the Z-shaped connector 89 disclosed in FIGS. 8A–8C and 9 is shown in FIG. 10. A stationary U-shaped connector 104 is used in lieu of connector 89 to connect flexible hose 90 to hose 96. The position of hose 90 when tray 92 is retracted beneath tray 94 is indicated by dashed lines.

It should be noted that in the embodiments of FIGS. 8A–10, two trays 92, 94 are shown. As is evident by the room remaining in tray 94 with tray 92 fully retracted beneath it, articulated Z-shaped connector 89 and U-shaped connector 104 may be used with three segment bridges if desired. Thus, trays 92, 94 may be mounted to underlie segments 16, 14 of structure 12.

Other modification and variation can be made to the disclosed embodiments without departing from the subject of the invention as defined in the following claims.

What is claimed is:

1. A flexible conduit take-up apparatus for use with a telescoping structure comprising:
   a tray;
   means for connecting said tray to said structure;
   a fluid conduit including a flexible first portion and a second portion; and
   guide means for fluidly coupling said first and second conduit portions, said guide means having first and second open ends coupled to said first and second conduit portions, said guide means configured to define a fluid path between said first and second open ends having first and second substantially right-angle turns.

2. The apparatus of claim 1 wherein said guide means includes a generally Z-shaped member and wherein said first and second ends are spaced apart at a substantial distance from one another.

3. The apparatus of claim 2 wherein said Z-shaped member is pivotally attached to the center of said tray.

4. The apparatus of claim 1 wherein said guide means includes first and second L-shaped legs coupled at an articulated joint so said legs have a generally Z-shape when extended and a generally L-shape when folded back upon one another.

5. The apparatus of claim 1 wherein said guide means includes a U-shaped member with said first and second open ends being closely spaced apart and facing in substantially the same direction.

6. Apparatus for supplying a pressurized fluid between opposite ends of a telescoping structure comprising:
   a tray;
   means for supporting said tray by said structure;
   first and second flexible hoses having respective outer and inner ends, at least a portion of said hoses supported within said tray; and
   means for fluidly connecting said first and second hoses, said connecting means supported within said tray and having a first end fluidly connected to said outer end of said first hose and having a second end fluidly connected to said inner end of said second hose, said first and second ends spaced apart and facing divergent directions so that said outer end of said first hose extends away from said connecting means in a first direction and said inner end of said second hose extends in a second direction.

7. The apparatus of claim 6 wherein said tray is supported below said structure.

8. The apparatus of claim 6 wherein said tray is about one-third the length of the structure when said structure is fully extended.

9. The apparatus of claim 8 wherein said tray is supported centrally along said structure so that said hose feeds into both ends of said tray.

10. The apparatus of claim 6 wherein said inner end of said first hose is fluidly connected to a rigid pipe.

11. The apparatus of claim 10 wherein there is one tray and said first hose is of a length to remain supported by said tray.

12. The apparatus of claim 6 wherein first and second ends face in opposite directions.

13. The apparatus of claim 6 wherein said hose connecting means is generally Z-shaped.

14. The apparatus of claim 6 wherein said hose connecting means is mounted to said tray.

15. The apparatus of claim 14 wherein said hose connecting means is pivotally mounted to said tray.

16. The apparatus of claim 14 wherein said pivotally mounted hose connecting means is centrally mounted to said tray.

17. The apparatus of claim 16 wherein said hose connecting means is generally Z-shaped.

18. Apparatus for supporting a flexible hose adjacent a telescoping structure comprising:
   a tray having a bottom for supporting said hose thereon;
   means for attaching said tray to said structure; and
   a generally Z-shaped fluid connection member, said connection member spliced medially along said hose and mounted to said bottom of said tray.

19. The apparatus of claim 18 wherein said fluid connection member is mounted centrally to said bottom of said tray.

20. The apparatus of claim 19 wherein said fluid connection member is pivotally mounted centrally to said bottom of said tray.

21. Apparatus for supplying a fluid between opposite ends of a telescoping structure comprising:
   a tray;
   means for supporting said tray adjacent a central portion of said structure;
   a first rigid pipe supported at one end at a first end of said structure and at the other end by said tray;
   a second rigid pipe supported at one end at a second end of said structure and at the other end by said tray; and
   a flexible hose connecting said other ends of said first and second rigid pipes and supported within said tray whereby telescoping movement of said structure is accommodated by said flexible hose within said tray.

22. The apparatus of claim 21 wherein said flexible hose includes first and second segments joined by a generally Z-shaped fluid connection member.

23. The apparatus of claim 21 wherein there is one tray.

24. The apparatus of claim 22 wherein said Z-shaped member is pivotally mounted centrally within said tray.

25. A flexible conduit take-up apparatus for use with a telescoping structure comprising:
a tray;
means for connecting said tray to the structure;
a conduit including a flexible first portion and a second portion; and
guide means, mounted on said tray, for operatively coupling said first and second portions, said guide means comprising:
a generally Z-shaped member having spaced-apart ends facing in divergent directions and connected to said first and second portions.

26. A flexible conduit take-up apparatus for use with a telescoping structure comprising:
a tray;
means for connecting said tray to the structure;
a conduit including a flexible first portion and a second portion; and
guide means, mounted on said tray, for operatively coupling said first and second portions, said guide means comprising:
a generally U-shaped member having closely spaced ends facing in the same direction and to which said first and second portions are connected.

27. A flexible conduit take-up apparatus for use with a telescoping structure comprising:
a tray;
means for connecting said tray to the structure;
a conduit including a flexible first portion and a second portion; and
guide means, mounted on said tray, for operatively coupling said first and second portions, said guide means comprising:
an articulated member having a first and second generally L-shaped leg, said articulated member having a generally Z-shape when said legs are extended and having a generally L-shape when said legs are folded back upon themselves with a movable leg thereof is connected to said first portion and the other leg is connected to said second portion.

* * * * *